US011692653B2

(12) United States Patent
Lippka

(10) Patent No.: US 11,692,653 B2
(45) Date of Patent: *Jul. 4, 2023

(54) PRE-ASSEMBLED PIPE COUPLING WITH AN INSERTION BOUNDARY FOR AXIAL RECEIPT OF PIPE ENDS

(71) Applicant: Tyco Fire Products LP, Lansdale, PA (US)

(72) Inventor: Sandra M. Lippka, Warwick, RI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/743,095

(22) Filed: May 12, 2022

(65) Prior Publication Data

US 2022/0268379 A1 Aug. 25, 2022

Related U.S. Application Data

(63) Continuation of application No. 16/616,150, filed as application No. PCT/US2018/034914 on May 29, 2018, now Pat. No. 11,378,209.

(Continued)

(51) Int. Cl.
*F16L 21/06* (2006.01)
*F16L 21/02* (2006.01)

(52) U.S. Cl.
CPC ........... *F16L 21/065* (2013.01); *F16L 21/022* (2013.01)

(58) Field of Classification Search
CPC ....... F16L 17/025; F16L 17/03; F16L 17/035; F16L 17/04; F16L 21/02; F16L 21/03;
(Continued)

(56) References Cited

U.S. PATENT DOCUMENTS 3,351,352 A 11/1967 8Lakeley
3,464,722 A 9/1969 Larkin
(Continued)

FOREIGN PATENT DOCUMENTS

EP 2 494 250 9/2012
GB 1 129 246 10/1968
(Continued)

OTHER PUBLICATIONS

English Translation of Office Action Received for Taiwan Application No. 107118269, dated Jan. 8, 2019, 4 pages.

(Continued)

*Primary Examiner* — Aaron M Dunwoody
(74) *Attorney, Agent, or Firm* — Foley & Lardner LLP

(57) ABSTRACT

A pre-assembled pipe coupling includes a gasket, a housing surrounding the gasket, and a fastener. The housing has three segments sequentially coupled to each other to define an insertion boundary. A bridge segment has a first mount extending lateral from the wall and having a plurality of first lateral walls defining a first aperture and a second mount having a plurality of second lateral walls defining a second aperture. A first clamp segment has a first hook disposed in the first aperture. A second clamp segment has a second hook disposed in the second aperture. The fastener is disposed through the first fastener aperture and the second fastener aperture. The fastener has an adjusted length at which the first clamp segment grips the gasket, and the second clamp segment grips the gasket to locate the first sealing lip and the second sealing lip within the insertion boundary.

18 Claims, 15 Drawing Sheets

Related U.S. Application Data

(60) Provisional application No. 62/512,518, filed on May 30, 2017.

(58) Field of Classification Search
CPC ....... F16L 21/06; F16L 21/022; F16L 55/172; F16L 55/1725; F16L 55/1705; F16L 55/17
See application file for complete search history.

(56) References Cited

U.S. PATENT DOCUMENTS

| | | | |
|---|---|---|---|
| 3,964,773 | A | 6/1976 | Stade et al. |
| 4,915,418 | A | 4/1990 | Palatchy |
| 5,018,768 | A | 5/1991 | Palatchy |
| 5,282,654 | A | 2/1994 | Hendrickson |
| 5,509,702 | A | 4/1996 | Warehime et al. |
| 5,499,849 | A | 5/1996 | Fend |
| 8,646,165 | B2 | 2/2014 | Gibb et al. |
| 8,733,799 | B2 | 5/2014 | Gibb et al. |
| 2005/0253383 | A1* | 11/2005 | Gibb ................. F16L 21/02 285/112 |
| 2012/0256415 | A1 | 10/2012 | Dole |
| 2013/0125373 | A1 | 5/2013 | Bancroft |
| 2014/0132000 | A1* | 5/2014 | Ben-Horin .......... F16K 27/0218 285/373 |
| 2020/0088327 | A1 | 3/2020 | Lippka |
| 2020/0088330 | A1 | 3/2020 | Lippka |
| 2020/0103062 | A1 | 4/2020 | Belen et al. |
| 2020/0284382 | A1 | 9/2020 | Lenz et al. |
| 2020/0378532 | A1 | 12/2020 | Tan et al. |
| 2020/0408339 | A1 | 12/2020 | Tan et al. |
| 2021/0262595 | A1 | 8/2021 | Zhang et al. |

FOREIGN PATENT DOCUMENTS

| | | |
|---|---|---|
| GB | 2 349 189 | 10/2000 |
| WO | WO-2014/135649 | 9/2014 |

OTHER PUBLICATIONS

International Search Report and Written Opinion for International Application No. PCT/US2018/034914, dated Jul. 31, 2018, 17 pages.

* cited by examiner

PRE-ASSEMBLED PIPE COUPLING WITH AN INSERTION BOUNDARY FOR AXIAL RECEIPT OF PIPE ENDS

CROSS-REFERENCE TO RELATED APPLICATIONS

The present disclosure is a continuation of U.S. patent application Ser. No. 16/616,150, filed Nov. 22, 2019, which is a national phase application of International Application No. PCT/US2018/034914, filed May 29, 2018, which claims the benefit of and priority to U.S. Provisional Application No. 62/512,518, titled "Pre-Assembled Pipe Coupling with an Insertion Boundary for Axial Receipt of Pipe Ends," filed May 30, 2017, the disclosures of which is incorporated herein by reference in their entireties.

BACKGROUND

Pipe couplings can be used to secure multiple pipe ends to one another. Pipe couplings can include seals, such as gaskets, to prevent fluid from leaking out of the pipes at the pipe coupling.

SUMMARY

One implementation of the present disclosure is a pre-assembled pipe coupling for insertion of pipe ends. The pre-assembled pipe coupling includes a gasket for forming a seal about a pipe joint, a housing surrounding the gasket, and a fastener. The gasket includes an annular base disposed about a gasket axis, a central flange extending from the annular base toward the gasket axis, the flange being disposed about a central plane perpendicular the gasket axis, a first side flange spaced from the central flange and extending from the annular base toward the gasket axis, the first side flange having a first sealing lip, a second side flange spaced from the central flange opposite the first side flange and extending from the annular base toward the gasket axis, the second side flange having a second sealing lip. The housing has a three segments, the three segments being sequentially coupled to each other to define an insertion boundary, each segment having a wall with an exterior surface and interior surface, the interior surface being disposed symmetrically about a medial plane, the wall having a medial portion, a first lateral portion connected to the medial portion, and a second lateral portion connected to the medial portion, the second lateral portion being spaced from the first lateral portion along the coupling axis so that the interior surface defines a cavity, the first and second lateral portions having pipe engagement members. The three segments include a bridge segment, a first clamp segment, and second clamp segment, the bridge segment having a first mount extending lateral in a first direction from the wall, the first mount having a plurality of first lateral walls that define a first perimeter of a first aperture, and a second mount extending laterally in a second direction from the wall, the second mount having a plurality of second lateral walls that define a second perimeter of a second aperture; the first clamp segment having a first hook disposed in the first aperture and a first tab defining a first fastener aperture; the second clamp segment having a second hook disposed in the second aperture and a second tab defining a second fastener aperture. The fastener is disposed through the first fastener aperture and the second fastener aperture, the fastener having an adjusted length at which the first clamp segment grips the gasket proximate the first hook and first tab, and the second clamp segment grips the gasket proximate the second hook and second tab to locate the first sealing lip and the second sealing lip within the insertion boundary.

Another implementation of the present disclosure is a pre-assembled pipe coupling for insertion of pipe ends. The pre-assembled pipe coupling includes a gasket for forming a seal about a pipe joint, a housing surrounding the gasket, and a fastener. The gasket includes an annular base disposed about a gasket axis, a central flange extending from the annular base toward the gasket axis, the flange being disposed about a central plane perpendicular the gasket axis, a first side flange spaced from the central flange and extending from the annular base toward the gasket axis, the first side flange having a first sealing lip, a second side flange spaced from the central flange opposite the first side flange and extending from the annular base toward the gasket axis, the second side flange having a second sealing lip. The housing has a plurality of segments, the plurality of segments being sequentially coupled to each other to define an insertion boundary, each segment having a wall with an exterior surface and interior surface, the interior surface being disposed symmetrically about a medial plane, the wall having a medial portion, a first lateral portion connected to the medial portion, and a second lateral portion connected to the medial portion, the second lateral portion being spaced from the first lateral portion along the coupling axis so that the interior surface defines a cavity, the first and second lateral portions having pipe engagement members. At least one first segment includes a first mount and a second mount, the first mount extending laterally in a first direction from the wall, the first mount having a plurality of first lateral walls that define a first perimeter of a first aperture. The second mount extending laterally in a second direction from the wall, the second mount having a plurality of second lateral walls that define a second perimeter of a second aperture, the second perimeter and the first perimeter being located on a common plane. The fastener connects a second segment to a third segment.

Another implementation of the present disclosure is a method of joining a pair of pipe ends in an axial arrangement with a pre-assembled coupling. The pre-assembled pipe coupling includes a housing surrounding a coupling axis and an annular gasket having a gasket axis contained within the housing such that the gasket axis is aligned parallel with the coupling axis, the gasket having an annular base with a central flange extending from the annular base toward the gasket axis with a pair of side flanges spaced oppositely about the central flange, each side flange having a sealing lip for receiving one of the pipe ends, the housing having a having a plurality of segments and a plurality of attachment mechanisms, each segment having a first terminal end a second terminal end in an interconnected relationship in which the terminal end of one segment is attached to a terminal end of another segment by one of the plurality of attachment mechanisms, each segment having a pair of lateral portions axially spaced apart with each lateral portion having a pipe engagement member. The method includes gripping the gasket with the first and second terminal ends of at least two segments to define an insertion boundary on each side of the housing that surrounds the coupling axis, axially inserting one of the pipe ends through the insertion boundary on each side of the housing, gripping the pipe ends with the sealing lips, and adjusting one of the attachment mechanisms so that the pipe engagement members engage the pipe ends and the sealing lips form a fluid tight seal about the pipe ends.

BRIEF DESCRIPTION OF THE DRAWINGS

The accompanying drawings, which are incorporated herein and constitute part of this specification, illustrate exemplary embodiments of the present disclosure, and together, with the general description given above and the detailed description given below, serve to explain the features of the present disclosure.

DETAILED DESCRIPTION

The present disclosure relates generally to pipe couplings and in particular pipe couplings with an outer housing and internal gasket that are pre-assembled before axially receiving two pipe ends to be joined in an axial alignment.

Figure 1:
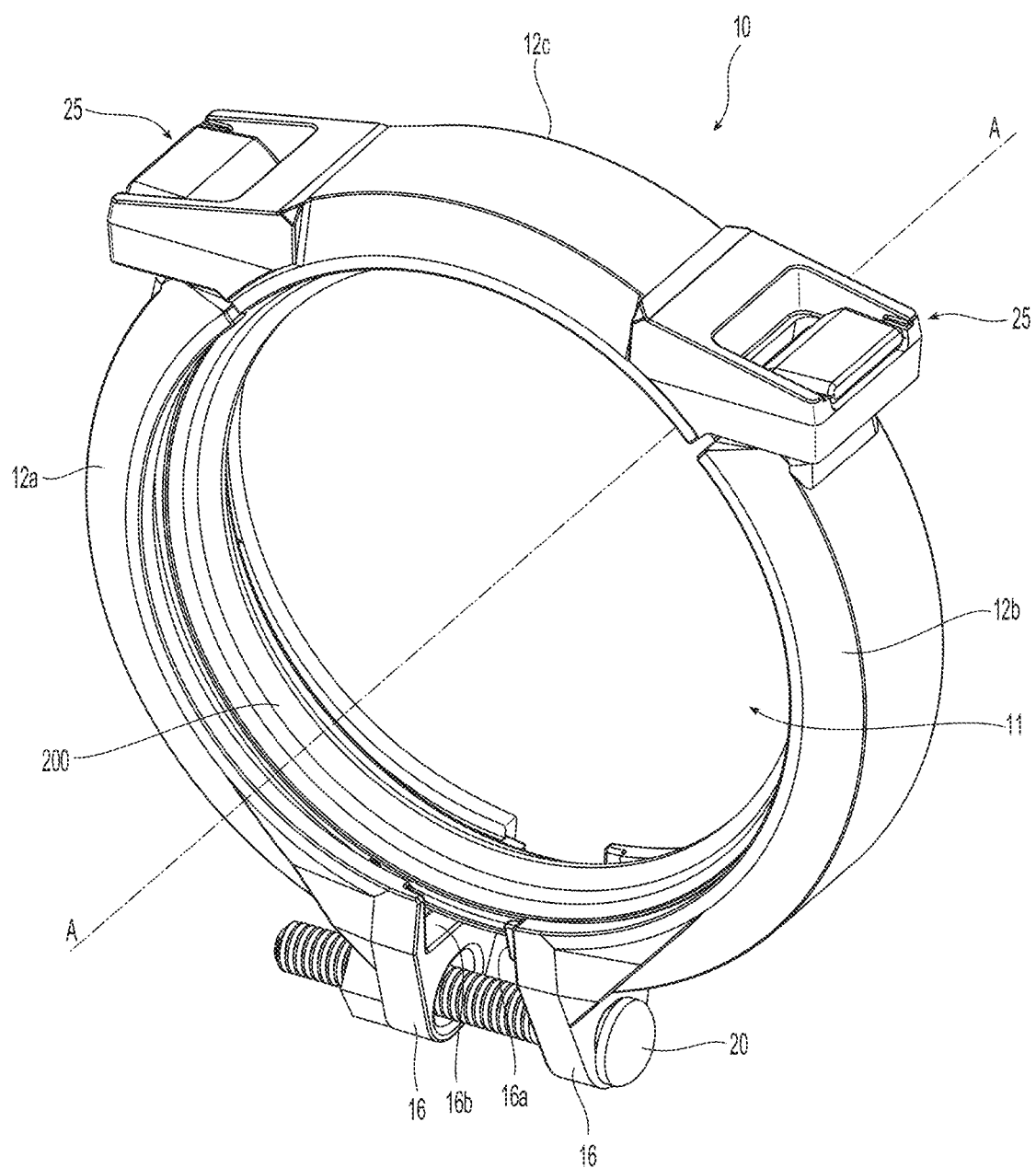
FIG. 1 is a perspective view of an embodiment of a pre-assembled pipe coupling.

Shown in FIG. 1 is a pipe coupling 10 (e.g., a pre-assembled pipe coupling) that can join two pipe ends in an axial alignment. As understood the pipe ends can be of any fluid carrying structure, such as for example, the end of a pipe, a pipe fitting, valve, or a fire protection sprinkler. The pre-assembled coupling includes a housing and gasket 200 disposed within the housing so that the housing and the gasket surround a coupling axis A-A. The housing has a plurality of coupling segments 12a, 12b, 12c. Each segment has two terminal ends, each of which in the pre-assembled coupling is attached to another terminal end of another segment via an attachment mechanism. The plurality of segments are attached or connected together in a sequential arrangement about the gasket 200 to define an insertion boundary 11 on each side of the housing that surrounds the coupling axis A-A and through which a pipe end can be axially inserted. The insertion boundary 11 defines an area bound by the sequentially connected segments. The insertion boundary 11 is defined by the portion of each segment that surrounds a central location within the area. The distance between the central location of the area and each portion of a respective segment is at least half the outer diameter of the pipe end to be inserted into the insertion boundary 11. Due to the distance relationship between each segment and the central location of the area, the insertion boundary can have minimum spans that are greater than the diameter of the pipe to be inserted into the pre-assembled coupling. The insertion boundary 11 can have various configurations due to the relative orientations of the segments and the attachment mechanisms to one another. Regardless of the selected orientation of the segments and the attachment mechanisms, and/or the number of segments and attachment mechanisms, the spans of the insertion boundary can have sufficient size to allow the pre-assembled coupling 10 to axially receive a pipe end. The plurality of coupling segments 12a, 12b, 12c can be made from more rigid material than existing systems, as the coupling segments 12a, 12b, 12c are not required to be deformable to allow effective installation of the pipe coupling 10.

The sequential arrangement of the segments of the plurality of segments provides for the pre-assembled coupling 10. A pre-assembled coupling can be a coupling in which all of the coupling segments are attached together to surround and locate the gasket of the coupling 10 in a manner as described herein for axial insertion of pipe ends through the insertion boundary 11, into the housing and into the gasket 200. The housing can include three segments. Any number of segments can be utilized with the appropriate attachment mechanisms so long as the segments are attached together in an interconnected arrangement about the gasket to provide a pre-assembled coupling arrangement.

The pre-assembled coupling 10 utilizes at least two attachment mechanisms to attach the plurality of segments together. As depicted in FIG. 1, one of the attachment mechanisms is an adjustable fastener, such a threaded bolt and a nut; any suitable adjustable fastener can be utilized, such as for example a toggle, and the other of the attachment mechanisms is an interlock. The three segments can be attached together utilizing two interlocks and a single adjustable fastener. The interlocks and adjustable fastener can allow the segments of the housing to be held together in an interconnected relationship to receive the pipe ends and thereafter be tightened about the pipe ends with the single adjustable fastener to form a fluid tight relationship. Further facilitating a pipe joint formation via the pre-assembled coupling 10 is a gasket 200 described herein that is disposed within the pre-assembled coupling 10. More specifically, the gasket 200 is an annular member having an internal and external geometry that facilitates receipt, insertion, gription and fluid tight sealing of the pipe ends. In particular, the internal geometry of the gasket 200 engages the outer surface of the pipe ends to allow the pipe to be inserted and then form a fluid tight seal. The external geometry of the gasket 200 engages the internal surfaces of the housing to center the gasket within the housing and properly locate the gasket about the interface between the pipe ends to form an effective fluid tight seal.

Figure 2:
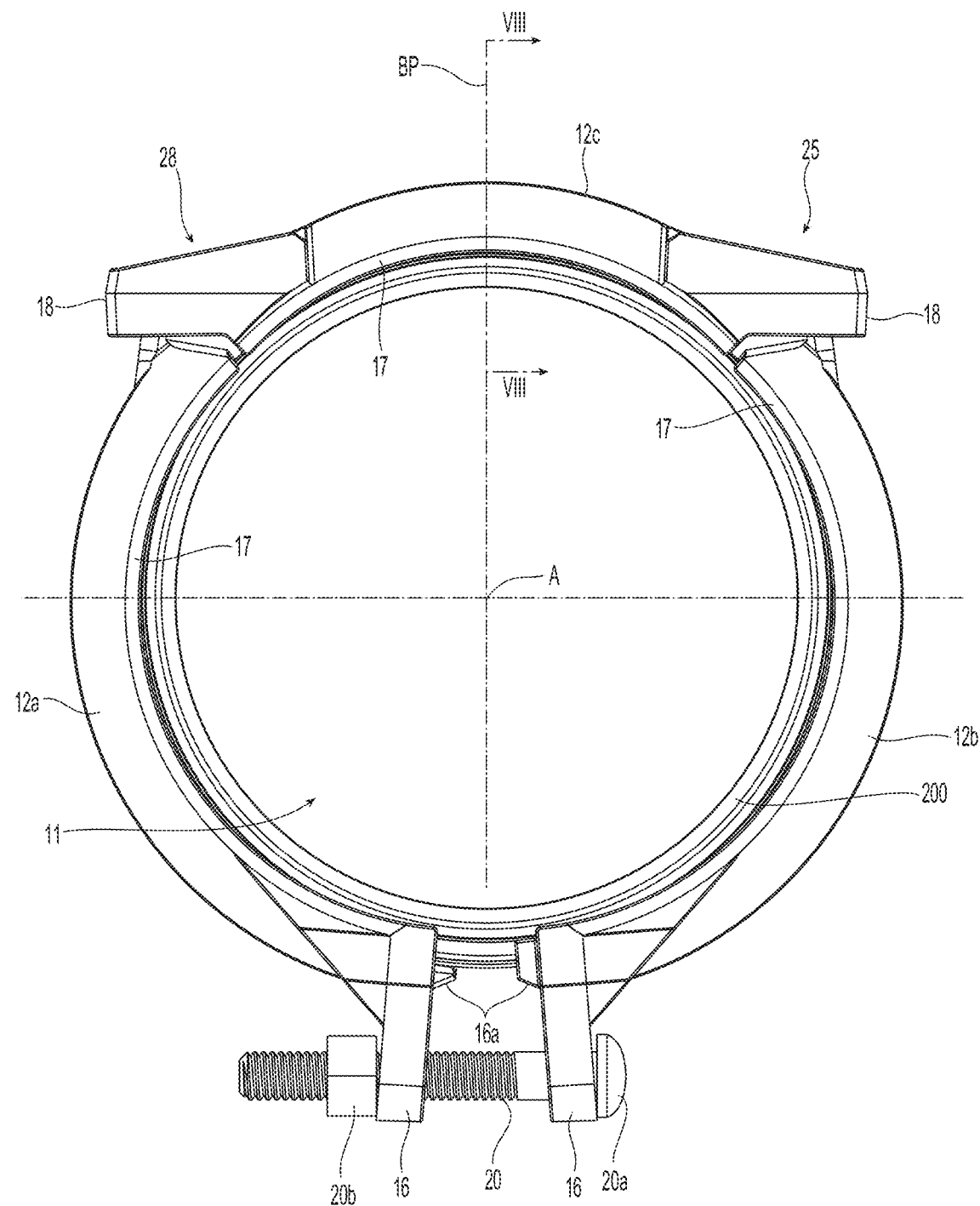
FIG. 2 is an elevation view of the pre-assembled pipe coupling of FIG. 1.
Figure 3:
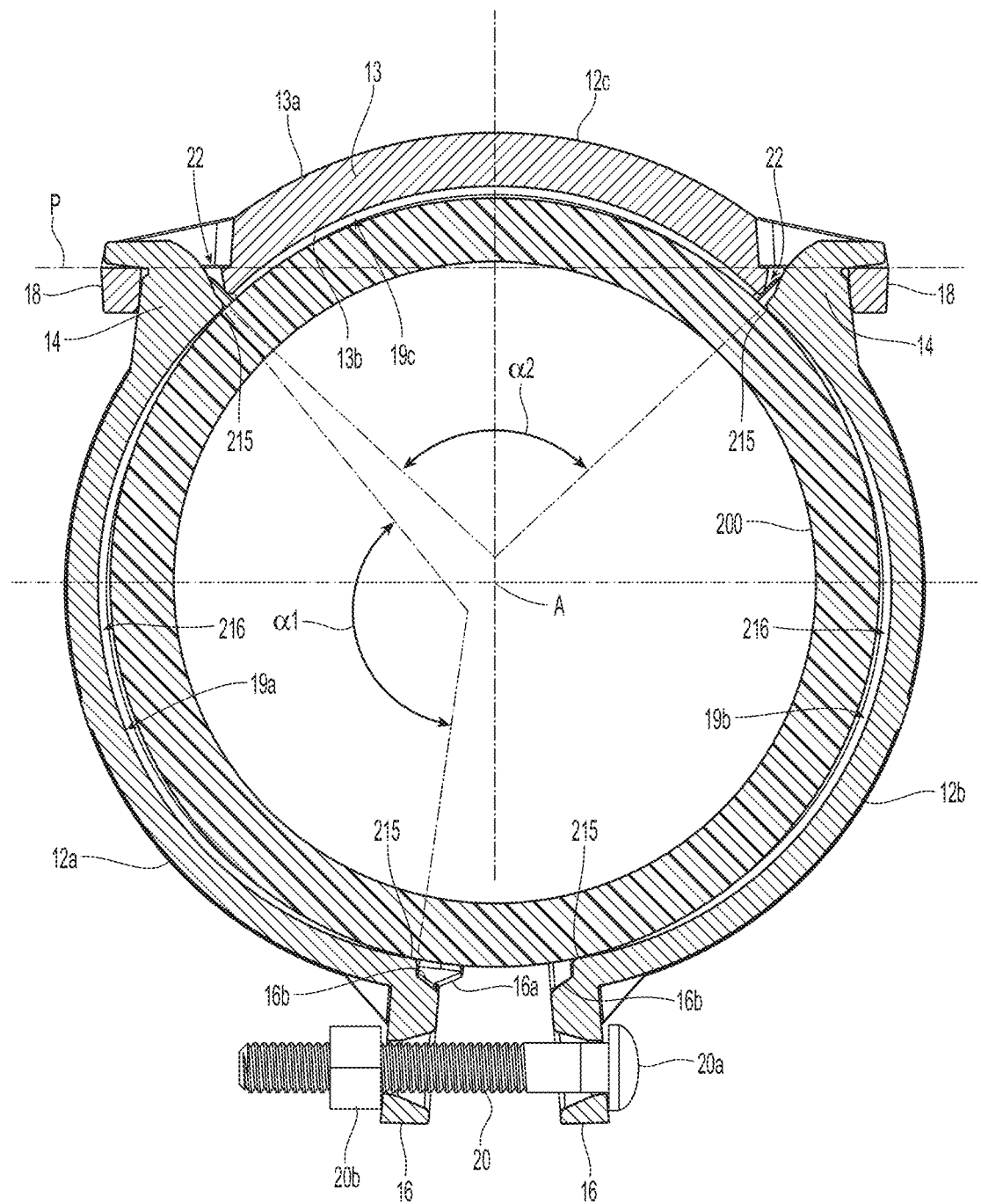
FIG. 3 depicts an open configuration of the pre-assembled pipe coupling for receipt of a pipe end.
Figure 4:
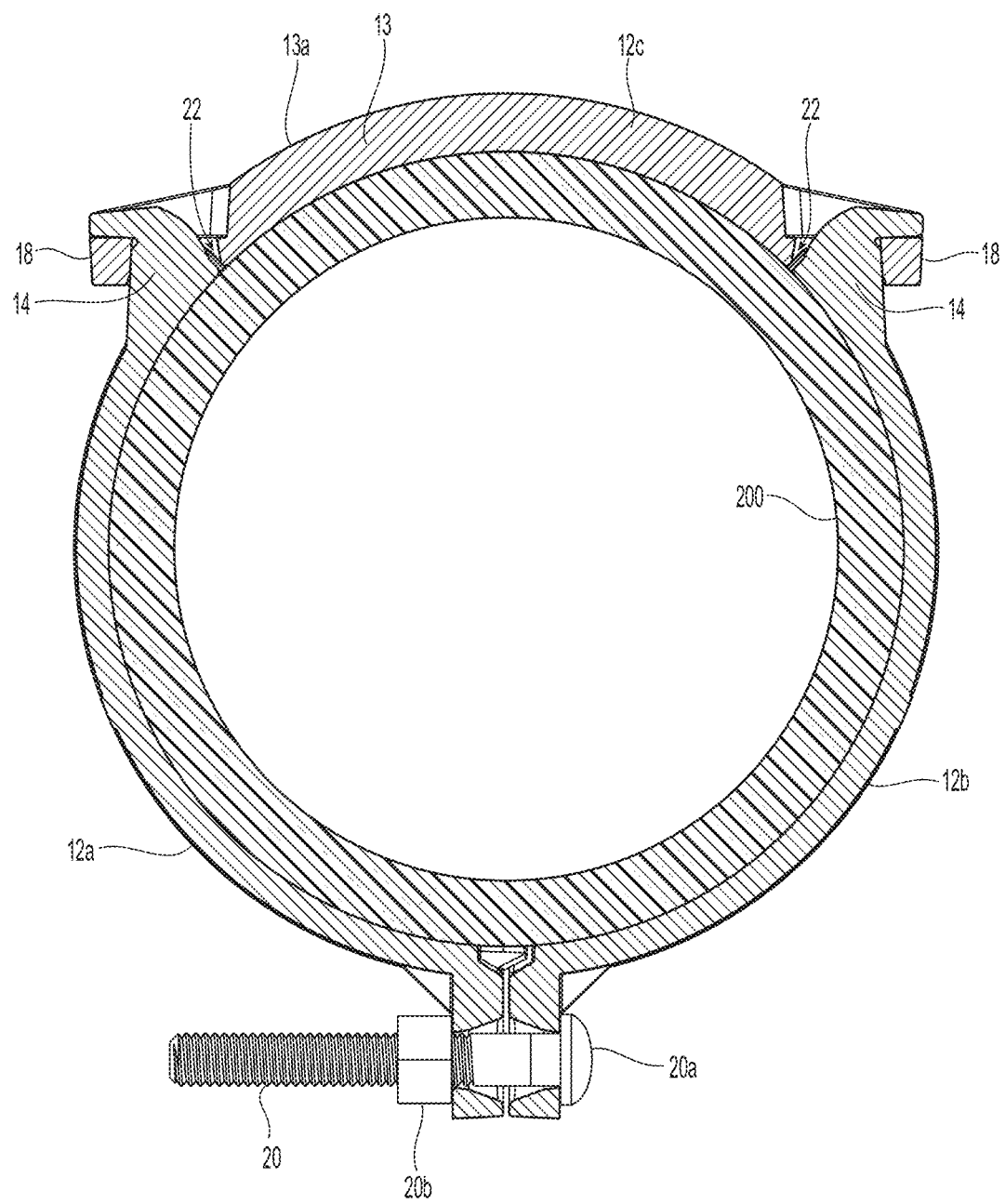
FIG. 4 depicts a closed configuration of the pre-assembled pipe coupling for forming a fluid tight seal about a pair of pipe ends.

FIGS. 2-4 depict a plan view of the coupling 10 with the housing surrounding the gasket 200, the gasket 200 depicted as being annular, in which each of the housing and the gasket 200 circumscribe the coupling axis A-A. The housing includes three segments 12a, 12b, 12c sequentially attached to each other to define the insertion boundary 11 about the coupling axis A-A. Each segment generally is an arcuate member with a wall 13 having an exterior surface 13a and an interior surface 13b. As depicted in FIGS. 2-4, the three segments can include two identical clamp segments 12a, 12b and a bridge segment 12c extending between the two identical clamp segments 12a, 12b.

Figure 8:
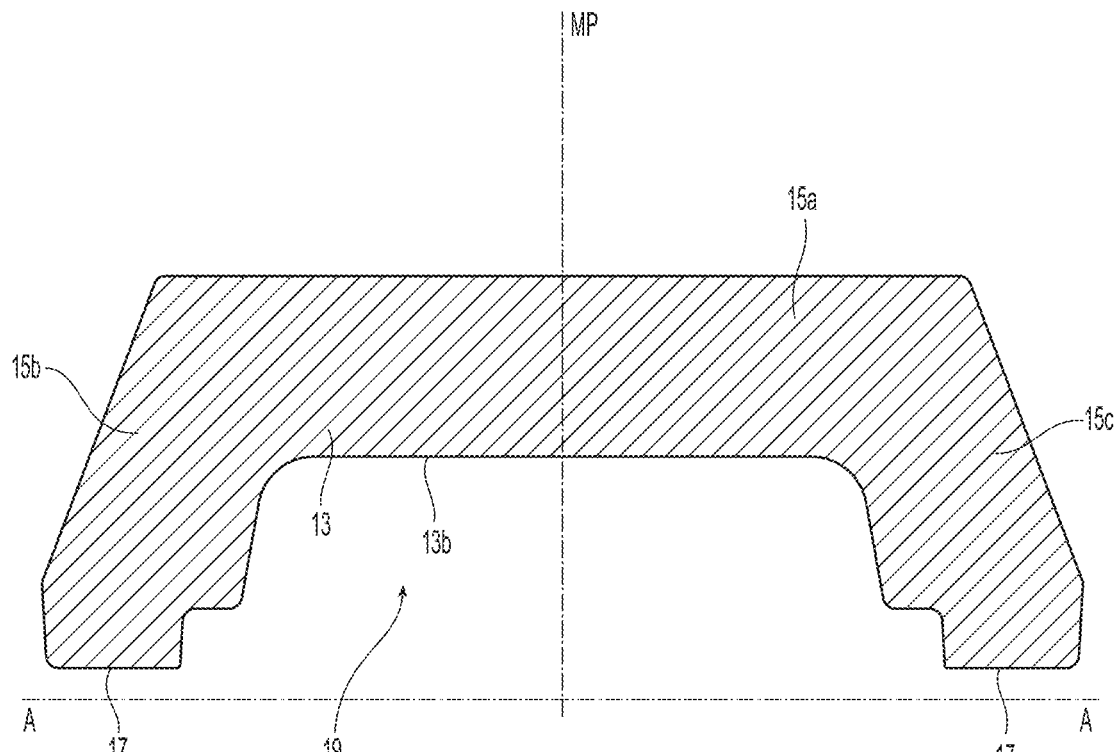
FIG. 8 is a partial cross-sectional view of a segment for use in the pre-assembled coupling of FIG. 1.

As seen in the simplified cross-sectional view of the bridge segment 12c shown in FIG. 8, the interior surface 13b can be symmetrical about a medial plane MP which is disposed perpendicular to the gasket axis A-A. The wall 13 has a medial portion 15a, a first lateral portion 15b, and a second lateral portion 15c with the medial portion 15a extending between the first and second lateral portions 15b, 15c. The second lateral portion 15c can be spaced apart from the first lateral portion 15b along the coupling axis A-A so that the interior surface 13b defines a cavity 19 for containing the gasket 200. Each of the first and second lateral portions 15b, 15c can extend between the terminal ends of the segment and can include a pipe engagement member 17 for engaging the outer surface of the pipe ends and more preferably for engaging grooves formed at the pipe ends. The pipe engagement members 17 can prevent or restrict the axial movement of the pipes with their engagement of the grooves. The pipe engagement members 17 can be utilized with other pipe configurations, such as for example, pipes with a shoulder. The pipe engagement members 17 can be configured to bite into a plain end pipe. The pipe engagement members 17 can be curved, as seen for example in FIG. 2, to engage the outer pipe surface. The pipe engagement members 17 can include one or more projections which extend in the axial direction to grip a surface forming the pipe groove.

With reference to FIG. 3, a hook 14 is depicted that can be integrally formed with each of the twin clamp segments 12a, 12b at one terminal end of the clamp segment and a fastener tab 16 at the opposite terminal end of the segment. The cavity 19a can traverse an arc of about 135° about a central axis of curvature of the clamp segment that extends parallel to the coupling axis A-A. The bridge segment 12c can be symmetrical about a bisecting plane BP with twin mounts 18 identically formed at opposite terminal ends of the segment disposed symmetrically about the bisecting plane BP and laterally of the wall 13 of the bridge segment 12c. Each of the mounts 18 can define the opening or aperture 22 through which the hook 14 of the clamp segments 12a, 12b extend. The bridge segment 12c can be formed such that the cavity 19c traverses an arc of about 90° about a central axis of curvature of the bridge segment that extends parallel to the coupling axis A-A. While the segments are depicted using a cavity that traverse arcs of about 135° (e.g., 135° plus or minus 10°) and about 90° (e.g., 90° plus or minus 10°) respectively about a center of curvature, any combination of suitable constant arcs could be utilized so long as the coupling segments can be attached with an appropriate attachment mechanism to provide the pre-assembled coupling.

A fastener 20 can join the clamp segments 12a, 12b to one another. The fastener 20 can be adjustable. The fastener 20 can be disposed diametrically from the bridge segment 12c in the through holes or apertures formed in the respective fastener tabs 16 of the twin clamp segments 12a, 12b. The fastener 20 can control the spacing between the tabs 16 to define one or more of the interconnected configurations of the housing segments and the resultant insertion boundary 11 as described herein. The head of the bolt can be a first securement portion 20a in contact with one fastener tab 16 and the nut can be a second securement portion 20b of the fastener 20 in contact with the other fastener tab 16 to secure the two segments 12a, 12b to one another. The through holes can be unthreaded and non-circular, and can be oval in shape. To prevent the bolt from freely spinning within the through hole, the bolt can include a complimentary oval shaped shanked portion to seat within the through hole of the fastener tab 16. With the bolt prevented from freely spinning within the through holes, the adjustable fastener 20 can be tightened and more specifically, the nut 20b can be tightened about the bolt to bring the fastener tabs 16 in a confronting relation to provide sufficient sealing of the gasket 200 about the pipe ends.

Figure 2A:
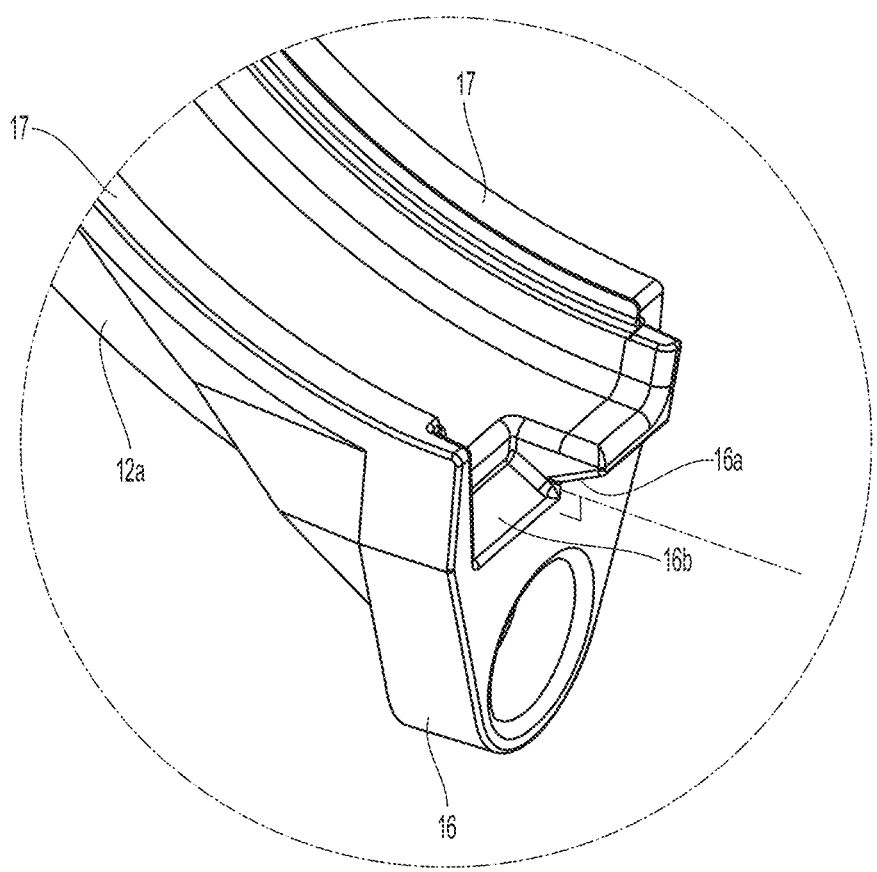
FIG. 2A is a detailed view of a terminal end of a housing segment for use in the pre-assembled pipe coupling of FIG. 1.

FIG. 4 depicts the nut 20b completely threaded onto the bolt to bring the fastener tabs 16 of the clamp segments 12a, 12b in the confronting relationship. The fastener tabs 16 can include complementary tongue 16a and recess 16b which engage one another to facilitate alignment between the fastener tabs 16. On each fastening tab 16, the tongue 16a and the recess 16b can be located side by side with the tongue 16a located generally on an opposite side of a medial plane bisecting the fastener tab 16 from the recess 16b. When the fastener tabs 16 oppose one another with the fastener 20 fully tightened, the tongue 16a can be received in the recess 16b. Each recess 16b is slightly larger than the tongue 16a to receive the tongue 16a of the opposed clamp segment and form a tongue-and-recess interfit when the fastening tabs are brought together in their full confronting relationship by the fastener tab 16. The shape of the tongue 16a and the shape of the recess 16b can be any shape such that the tongue 16a fits within the recess 22. The tongue 16a can include an external surface that mates or confront an internal recess 16b in which the surfaces are angled or skewed with respect to an axis disposed normal to the mating face of the fastener tab 16 as depicted, for example, in FIG. 2A. The complementary angled surfaces can facilitate engagement and disengagement of the fastener tabs upon corresponding tightening and loosening of the fastener 20. The angled surfaces can facilitate interaction between the twin clamp segments 12a, 12b with non-interference for use with the single adjustable fastener 20.

Figure 5:
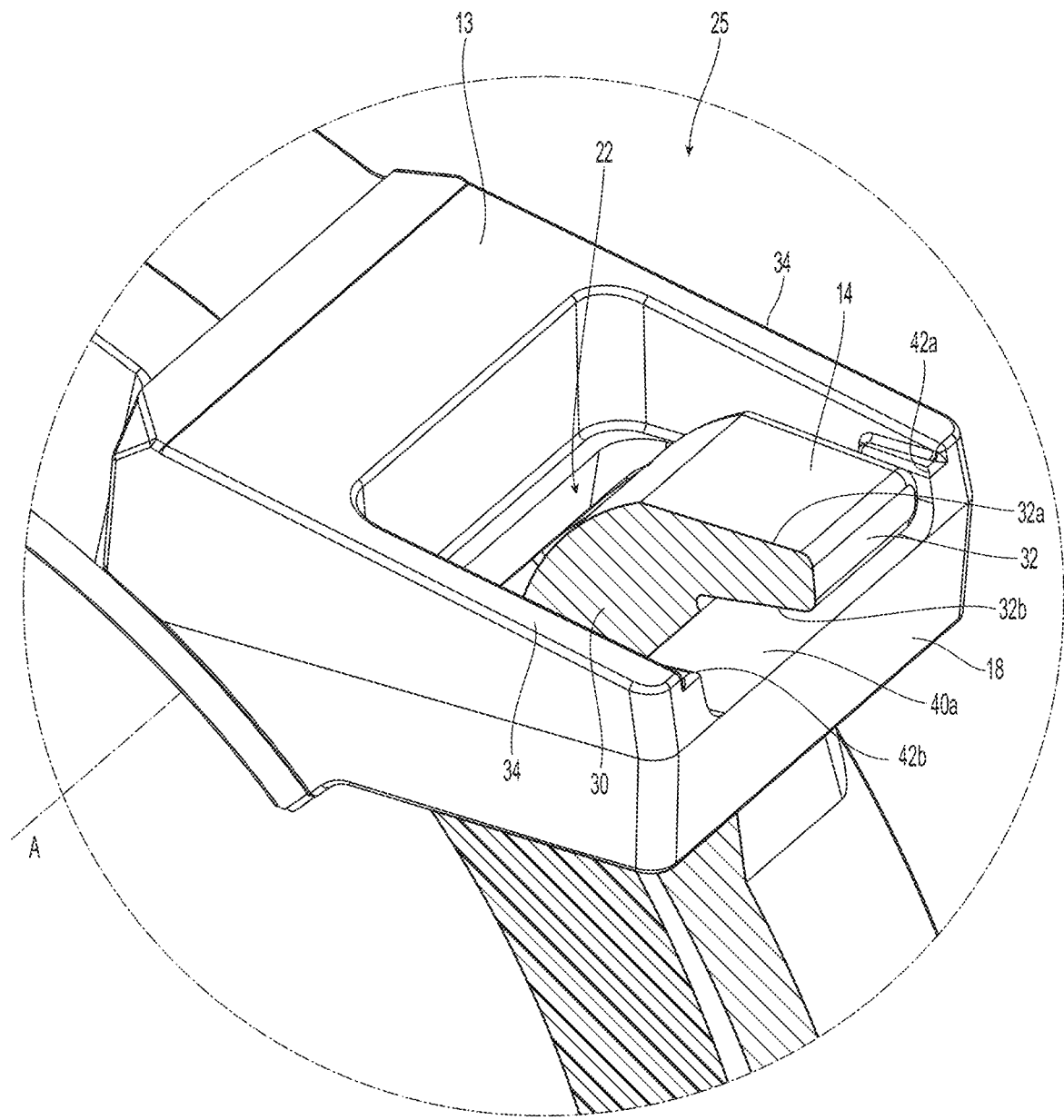
FIG. 5 is a detailed perspective partial cross-sectional view of an interlock for use in the pre-assembled pipe coupling of FIG. 1.
Figure 6:
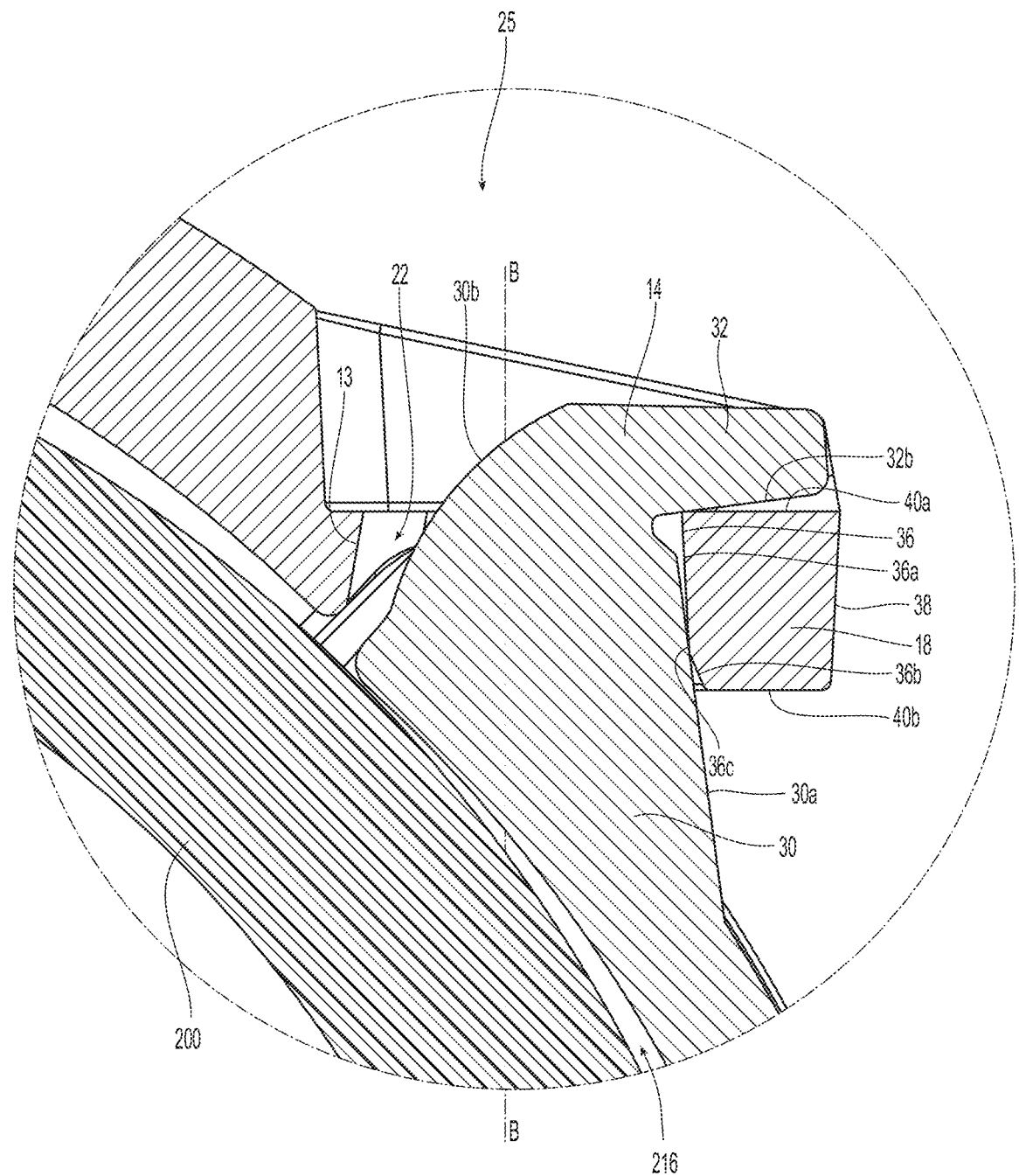
FIG. 6 is a detailed cross-sectional view of the interlock of FIG. 5 in an open configuration.
Figure 7:
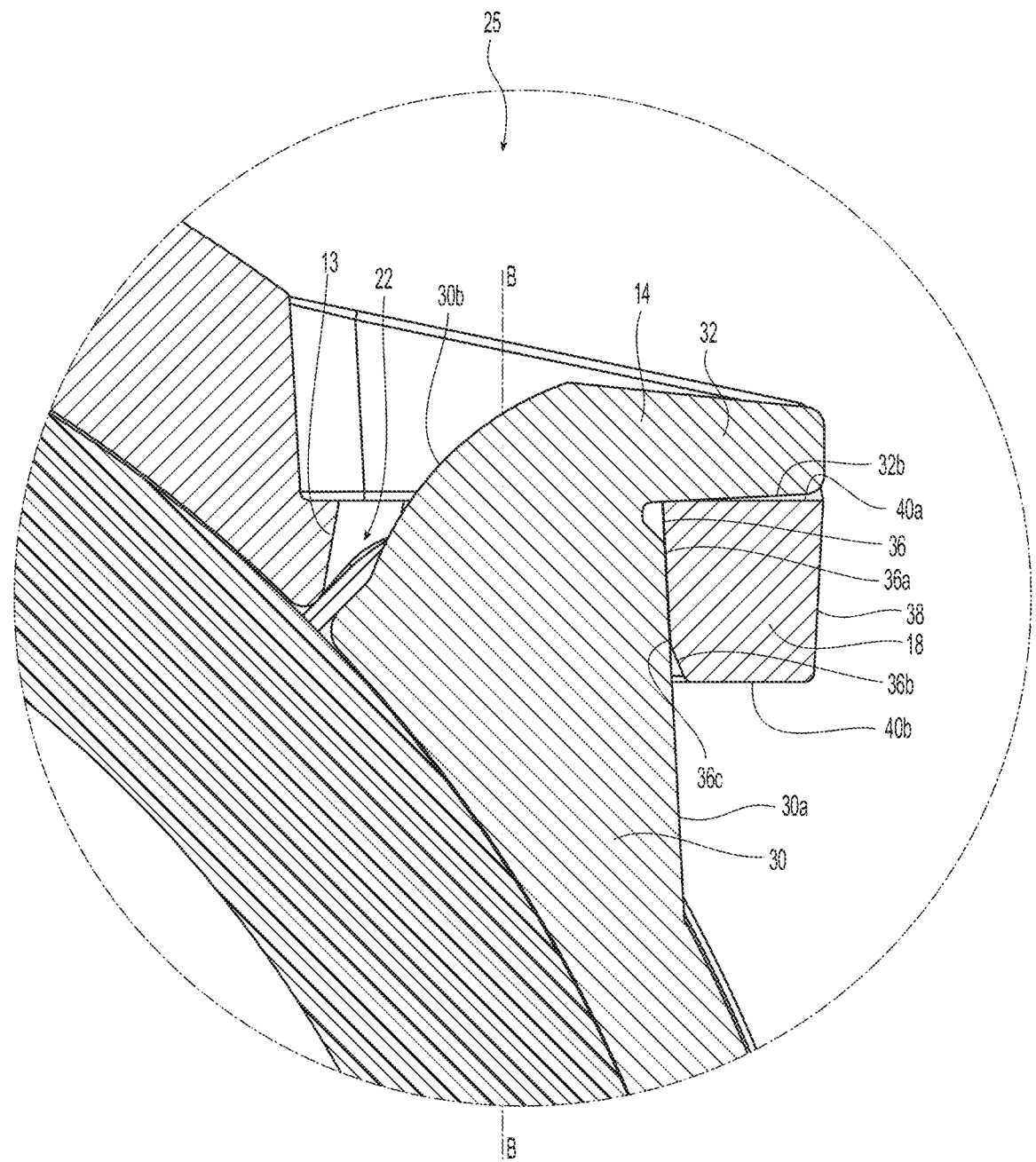
FIG. 7 is a detailed cross-sectional view of the interlock of FIG. 5 in a closed configuration.

In the assembly 10, each hook 14 is mounted within one of the two apertures 22 or mounting holes preferably identically formed at the opposite ends of the bridge segment 12c. Shown in FIGS. 5-7 are detailed views showing the interaction between a mount 18 of the bridge segment and a hook 14 of the clamp segment to form the attachment mechanism of interlock 25. The hook 14 can be formed to include a base 30 and a catch 32 in which the base 30 can taper narrowly in a direction toward the catch 32. Relative to the internal bend of the hook 14, the base 30 can have an inner surface 30a and an outer surface 30b that can converge toward one another in the direction toward and contiguous with the catch 32. The outer surface 30b of the base 30 can have a curved portion or profile contiguous with the catch 32 to facilitate insertion of the hook 14 through the aperture 22 to form the interlock 25. Each of the inner and outer surfaces 30a, 30b can extend between the wall 13 of the bridge 12c and the mount 18. Each mount 18 can be disposed laterally of the wall 13 with a pair of laterally extending spaced apart sidewalls 34 formed between the mount 18 and the wall 13 to define the aperture 22. Each of the wall 13, mount 18 and sidewalls 34 can provide internal and external surfaces with respect to the aperture 22. For example, the laterally disposed mount 18 can have an internal wall 36 and an external wall 38 with an upper floor surface 40a and a lower floor surface 40b extending between the internal and external walls 36, 38. For the mounts 18, which can be identical, respective upper floor surfaces 40a and thus the boundary of each aperture 22 can be substantially coplanar with one another in a plane P disposed perpendicular to the bisecting plane and parallel to the coupling axis A-A. While the boundary of the apertures 22 is depicted coplanar in the plane P, each aperture boundary can be disposed in separate parallel and offset planes each of which is perpendicular to the bisecting plane and parallel to the coupling axis A-A. The corresponding apertures 22 and their perimeters can be coplanar within the same plane P. The catch 32 can be wedge shaped and can taper narrowly in a direction away from the base 30. The catch 32 can have a planar upper surface 32a with a planar lower retention surface 32b to confront the upper floor 40a of the mount 18 in the various interlock formations as described herein. The hook 14 can be formed with a radius portion or transition between the inner surface 30a of the base 30 and the retention surface 32b of the catch 30.

In the bridge segment 12c, the internal wall 36 of the mount 18 along with the surfaces of the sidewalls 34 and the end of the wall 13 define the overall geometry of the aperture 22 and the interaction between the hook 14 and the mount 18. As seen in FIG. 6, the aperture 22 has depth defined by the axial spacing between the upper and lower floors 40a, 40b along a central axis B-B of the aperture 22. Additionally, the aperture 22 defines a variable length defined by the lateral spacing between the internal end surface of the wall 13 and the internal wall 36 of the mount 18 about the axis B-B. Each of the end surface of the wall 13 and internal wall 36 can define varying profiles with respect to the axis B-B. For example, the internal wall 36 can have a first surface 36a angled with respect axis B-B and a second surface 36b angled with respect to the first surface 36a to define an edge 36c located at the intersection of the first and second surfaces 36a, 36b. The first and second surfaces 36a, 36b can be angled such that the upper floor 40a has a greater length in the lateral direction than the lower floor 40b. The upper floor 40a and its spacing from the end surface of the wall 13 cinctures the aperture 22. Accordingly, the aperture 22 can include a generally tapering opening to the hook 14 upon insertion in the axial direction from the lower floor surface 40b to the upper surface 40a.

The attachments and relative spacing between the segments can define various states of the coupling assembly 10 to: (i) define the insertion boundary 11 for axial pipe insertion and (ii) engage the outer pipe surface and compress the gasket 200 about the inserted pipe to form the fluid tight seal about the pipe ends. To attach a clamp segment 12a, 12b to the bridge segment 12c, the hook 14 can be inserted into the aperture 22 proximate the lower floor 40b of the mount 18. The curved outer surface 30b of the base 30 can facilitate insertion of the hook 14 through the aperture 22 to form interlock 25. The catch 14 can be brought through the aperture 22 proximate the upper floor 40a of the mount 40 such that the retention surface 32b confronts the upper floor 40a preferably with a gap therebetween. In an open configuration of the interlock 25, the retention surface 32b can form a line contact with the inner edge of the upper floor 40a, as depicted for example, in FIG. 6. Moreover, the inner surface 30a of the base 30 can form a line contact with the intersection 36c of surfaces 36a, 36b on the internal wall 36 of the mount 18. In a closed configuration of the interlock 25 as depicted, for example in FIG. 7, the hook 14 can be pivoted about the intersection 36c to increase the confrontation between the retention surface 32b and the upper floor 40a such that the gap between the retention surface 32b and the floor 40a is reduced and in some instances can include surface contact between the retention surface 32b and the floor 40a. In the closed configuration, the inner surface 30a of the base 30 can be brought into surface contact with the first surface 36a of the internal wall 36 of the mount 18. Accordingly, as depicted in FIGS. 6 and 7, the intersection 36c can form a fulcrum on which the hook 14 pivots. Surfaces of the hook 14 and the mount 18 can be reversed or have a combination of surfaces such that the inner surface 30a of the hook base 30 defines a fulcrum on which the mount internal wall 36 pivots to form the closed configuration of the interlock 25. The pre-assembled coupling 10 can provides the interlock 25 with an internal pivot.

With reference to the perspective view of the interlock 25 depicted in FIG. 5, the hook 14 and mount 18 can each define a width in the direction of the coupling axis A-A. To further facilitate the interlock formation and the confrontation between the catch 32 and the upper floor 40a, the floor 40a can include a pair of guides 42a, 42b disposed on the floor 40a about the width of the mount 18, such as at the greatest lateral extent of the floor 40a. Each of the guides 42a, 42b can extend from the upper floor 40a to the top or upper surface of the sidewalls 34 or anywhere in between. In the closed configuration of the interlock 25, the guides 42a, 42b can confront the sides of the catch 32 to restrict lateral movement between the hook 14 and the mount 18 and/or center the catch 32 over the floor 40a. The spaced apart guides 42a, 42b in conjunction with the floor 40a can define a recess for receipt of the hook 14 and the catch 32.

Figure 9:
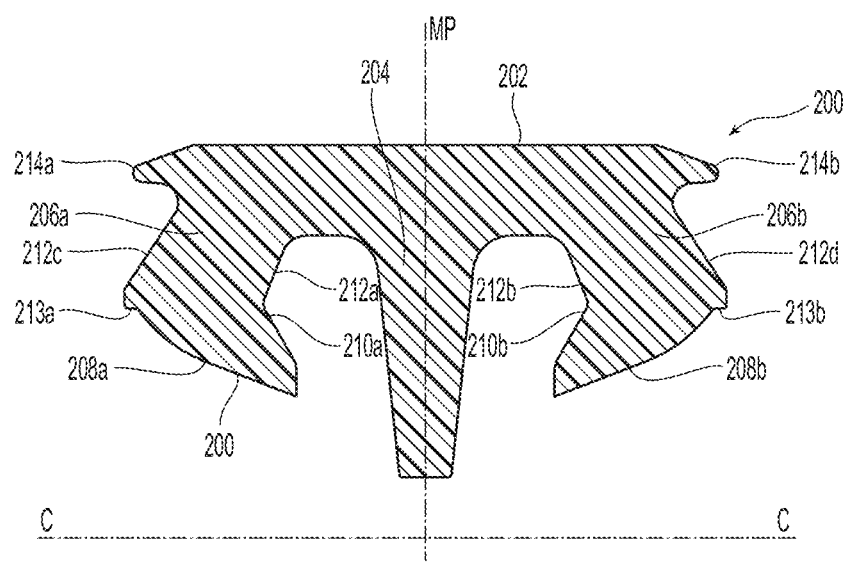
FIG. 9 is a partial cross-sectional view of a gasket for use in the pre-assembled coupling of FIG. 1.

With reference to the cross-sectional view of the gasket 200 depicted in FIG. 9, the gasket 200 includes an annular base 202 disposed about a gasket axis C-C which extends parallel to the coupling axis A-A in the assembly 10. A central flange 204 can be an elongate member that extends from the annular base toward the gasket axis C-C and is generally disposed in or about a central plane perpendicular the gasket axis and parallel to the medial plane MP. Symmetrically formed and spaced oppositely about the central flange 204 are a pair of side flanges 206a, 206b. Each side flange 206a, 206b can include a sealing lip 208a, 208b for gripping and/or forming a fluid tight seal with the outer surface of an inserted pipe end. As is described in greater detail below, as the pipe end is inserted axially into the gasket 200, the pipe end can contact a side flange 206a causing it to fold or collapse with the sealing lip forming the fluid tight seal about the pipe surface. The internal surfaces of the gasket 200 can include a flex point 210a, 210b formed between the central flange 204 and side flanges 206a, 206b to facilitate collapse of the flanges upon pipe insertion. Each of the first and second side flanges 206a, 206b can have an inner surface 212a, 212b contiguous with the central flange 204 which defines the flex points 210a, 210b. The inner surfaces 212a, 212b between the flex points and the central flange 204 can define a positive-slope transition portion between the sealing lips 208a, 208b and the central flange 204 which allows the side flanges 206a, 206b to fold in a desired manner.

The gasket 200 also includes structures that facilitates its contact with the interior surface of the housing. Preferably, each of the side flanges 206a, 206b includes a buttress 214a, 214b which extends axially in the direction of the gasket axis C-C toward the housing interior wall or surface 13b. Each buttress 214a, 214b extends axially from the side flanges 206a, 206b and has a tapering configuration to a terminal preferably radiused end. The buttresses 214a, 214b can act against the interior surface 13b of the housing segments 12 to resist axial gasket displacement and facilitate gasket expansion within the housing upon insertion of the pipe end. Each of the first and second side flanges 206a, 206b can have an outer surface 212c, 212d which can include a heel 213a, 213b, which assists in guiding axial insertion of the pipe end, maintains contact between the pipe end and the sealing lip 208a, 208b, and also acts against the interior surface 13b of the housing to center the gasket 200 within the housing. The heels 213a, 213b are the outermost edge of the sealing lips 208a, 208b axially spaced from the central flange 204 to define the entrance perimeter through which a pipe end is inserted into the gasket 200. Each of the heels 213a, 213b can have a profile defined by portions of the outer surfaces 212c, 212d that are disposed at right angles; however, an acute angle can be utilized. In the fluid tight sealed configuration of the coupling 10 described herein, the heel 213a, 213b lies against the pipe end outer surface and can present an abutment to the interior surface 13b of the housing to keep the gasket 200 centered within the housing.

Depending upon the extent to which the fastening tabs 16 of the clamp segments 12a, 12b are brought together by the fastener 20 to define the relative spacing between the segments 12a, 12b, 12c, the interior surfaces 13b of the individual segments 12a, 12b, 12c can form any one of a point, line or surface contact with the external surfaces of the gasket 200 to locate the gasket 200 or at least a portion thereof within the insertion boundary 11 of the coupling 10.

Referring again to FIGS. 3 and 6, the fastener 20 is depicted with the nut 20b threaded on the bolt within the fastener tabs 16 such that the segments 12a, 12b, 12c can be attached and positioned such that only the interior surface 13b at the terminal ends of the clamp segments 12a, 12b form a contact grip, preferably a line contact, about the exterior surface of the gasket 200. Depending on the relative size relationship between the gasket 200 and the cavity 19, the interior surface 13b at the ends of the clamp segments 12a, 12b can form a contact grip with each buttress 214a, 214b of the gasket 200 and preferably at the radiused ends of the buttress. The gasket 200 can be located at four locations 215 by the four terminal ends of the two clamp segments 12a, 12b of the housing. Between the terminal ends of a given clamp segment 12a, 12b, the outer annular surface of the gasket 200 can be radially spaced from the interior surface 13b of the segment to define a chamber 216 for the gasket along the cavity 19 of the segment 12a, 12b. With the clamp segments 12a, 12b locating the gasket 200 with a grip, the sealing lips 208a, 208b and in particular their heels 213a, 213b can be located within the insertion boundary 11, as depicted for example in FIG. 2, and readied for receipt of a pipe end. The pre-assembled coupling 10 can be configured such that the gasket 200 can be located by two coupling segments with at least one coupling segment suspended about or above the gasket 200. The bridge segment 12c can be suspended about the gasket 200 with its interior surface 13b spaced from the external annular surface of the gasket 200 and the cavity 19 unfilled therebetween. With the spaced apart segments 12a, 12b, 12c locating the gasket 200 within the housing in a gripped manner, the sealing lips 208a, 208b and in particular their heels 213a, 213b can be located and readied within the insertion boundary 11 for receipt of a pipe end.

Figure 10:
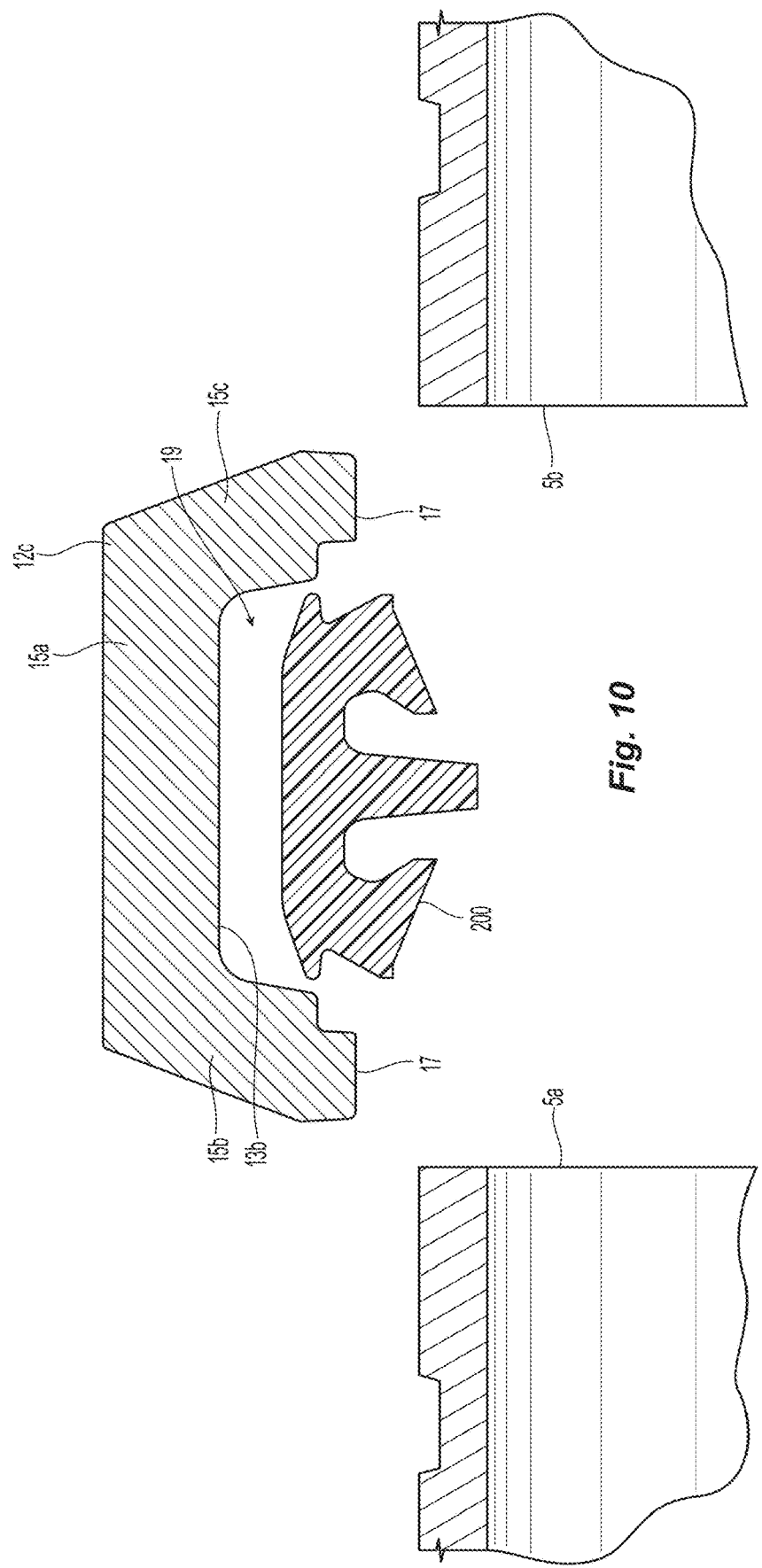
FIGS. 10-15 are partial cross-section views of a pipe joint formation using the pre-assembled coupling of FIG. 1.
Figure 11:
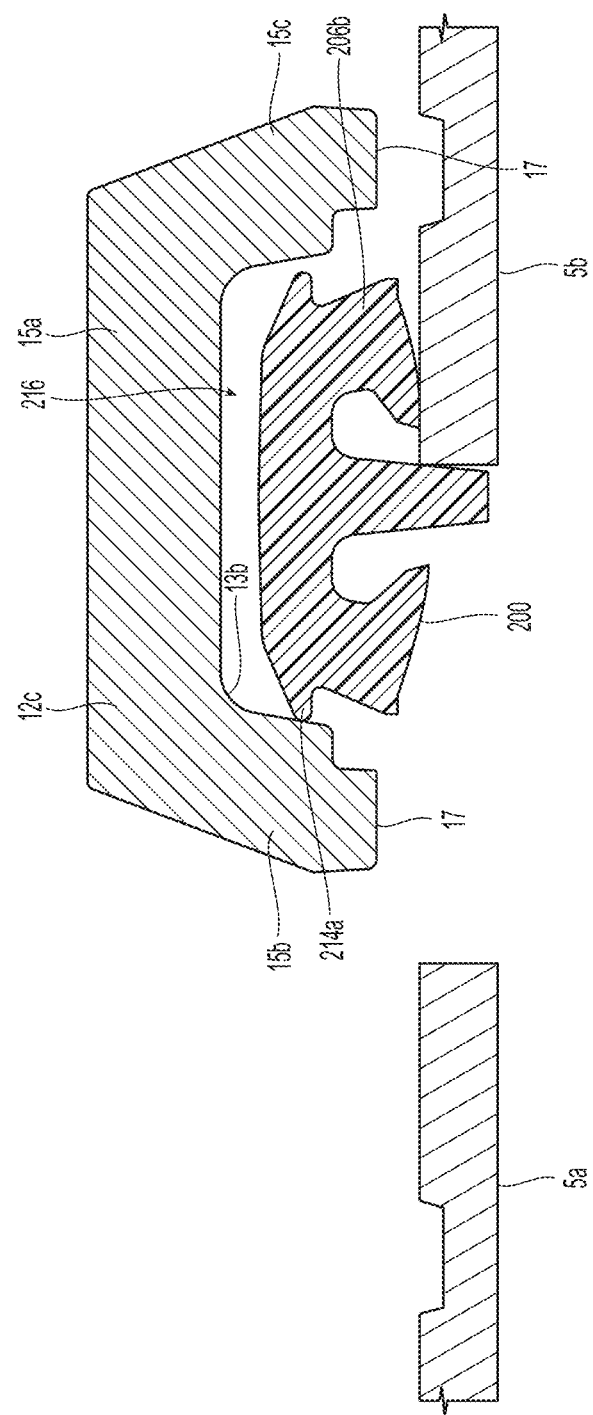
Figure 12:
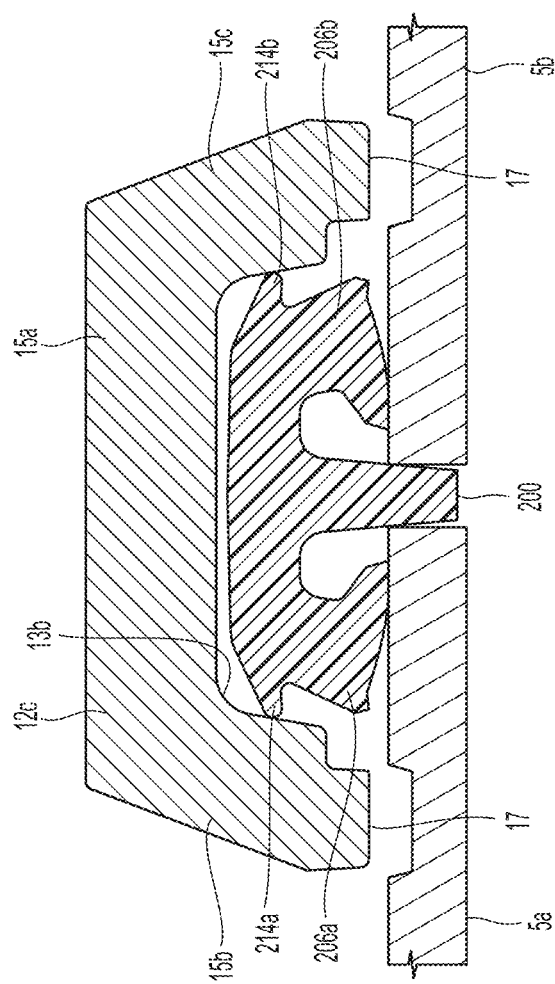
Figure 13:
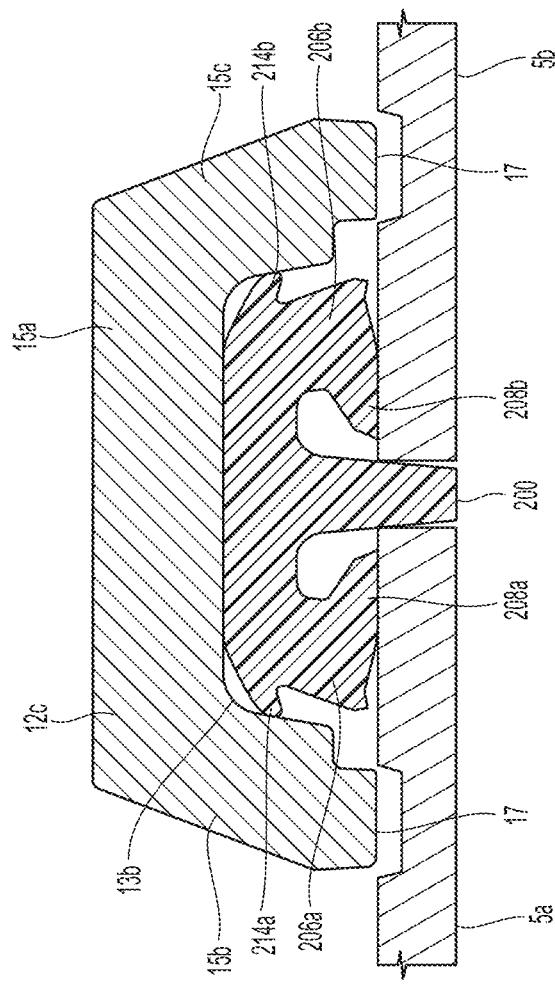
Figure 14:
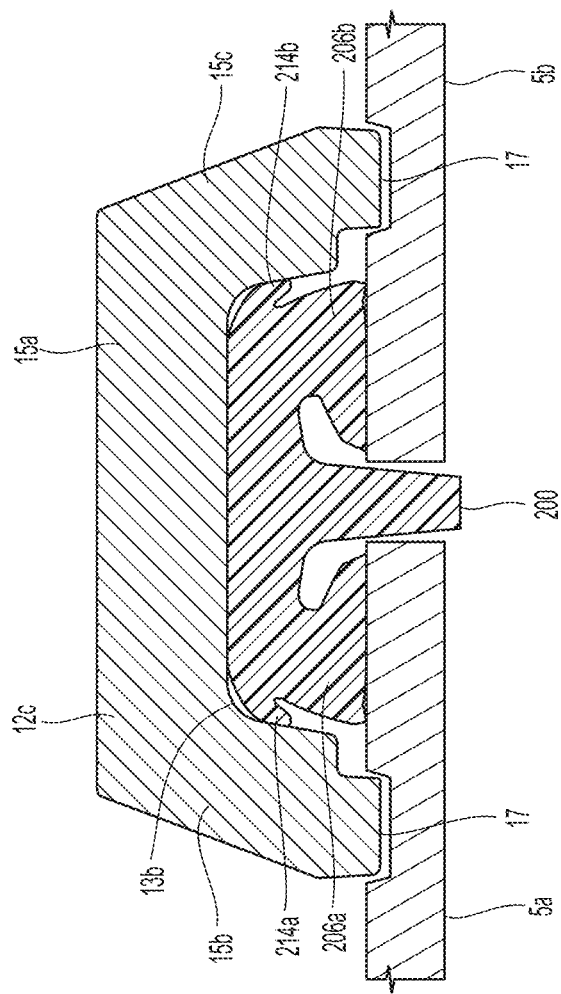
Figure 15:
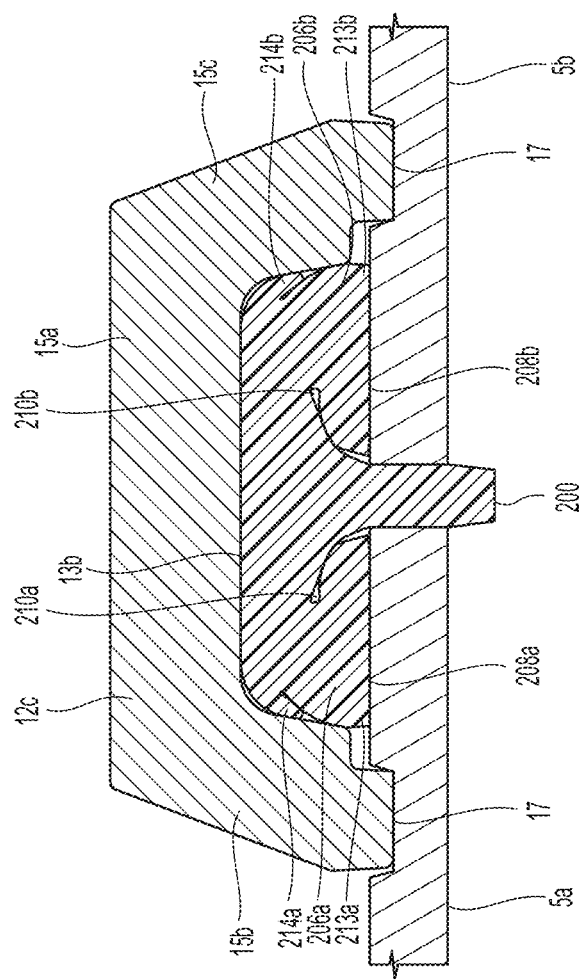

The gasket 200 can be located by two coupling segments with at least one coupling segment suspended about the gasket 200. The bridge segment 12c can be suspended about the gasket 200 with its interior surface 13 spaced from the external annular surface of the gasket 200 and the cavity 19 unfilled therebetween. FIGS. 10-15 illustrate the assembly of a pipe joint using the pre-assembled coupling assembly 10. Shown in FIG. 10 is a cross-sectional detailed view of the coupling 10 taken at the bisecting plane through the bridge segment 12c suspended above the gasket 200 with two pipe ends 5a, 5b positioned for axial insertion into the insertion boundary 11. The gasket 200 can be gripped by the two clamp segments 12a, 12b (not shown) in a manner as previously described with its sealing lips 208a, 208b positioned within the insertion boundary 11 for receipt of the pipe ends 5a, 5b. FIG. 11 shows a first pipe end 5b inserted into the coupling 10. The pipe end 5b impacts the side flange 206b causing it to deflect inward toward the central flange 204. The pipe insertion causes the gasket 200 to shift sideways such that the buttress 214a, opposite the deflected side flange 206b, impacts the interior surface 13b of the lateral portion 15b of the segment 12c. The interaction between the buttress 214a and the interior surface 13b can ensure that the gasket 200 is retained within the housing, and facilities centering of the gasket within the housing. The pipe insertion causes the gasket 200 to expand such that the outer peripheral surface of the gasket is expanded, such that it moves closer to the interior surface 13b of the medial portion thereby reducing the size of chamber 216. Due to the interaction of the sealing lips 208b gripping the outer surface of the pipe and the relative size of the outside diameter of the pipe 5b and the sealing lip 208b, the gription of the sealing lip 208b can grab pipe 5b. The gription of the sealing lip 208b can be sufficient to retain the pre-assembled coupling in position on the pipe 5b when the pipe 5b is disposed at various angular orientations relative to a horizontal plane and the pipe axis. The sealing lips 208a, 208b can have an interference fit with the pipes 5a. In FIG. 12, the second pipe end 5a has been inserted, the gasket 200 recenters and further expands within the chamber 216 and bringing the opposite buttress 214b into contact with the interior surface 13b of the adjacent lateral portion 15c. With the pipe ends 5a, 5b fully inserted, the central flange 204 extends between the pipe ends 5a, 5b, and the sealing lips 208a, 208b grip the outer surface of the pipe ends 5a, 5b as depicted for example in FIG. 13. Depicted in FIG. 14 is the coupling 10 being tightened about the pipe ends with the pipe engagement members 17 being brought into engagement with the pipe grooves. The gasket 200 can be further compressed within the chamber 216 such that the heels 213a, 213b are brought into engagement with the outer pipe surface and the buttresses 214a, 214b are deflected toward the pipe. In FIG. 15, the fastener 20 is fully tightened to bring the fastener tabs 16 of the clamp segments 12a, 12b together and enclose the gasket 200 about the pipe ends 5a, 5b such that the sealing lips 208a, 208b fully fold to form a fluid tight seal about the pipe ends 5a, 5b. The pipe engagement members 17 are engaged within the outer pipe grooves, preferably with complete contact between the base of the groove and the engagement member 17 to form a rigid pipe joint. The pre-assembled coupling enables a method for forming a rigid pipe joint in which a gasket is suitably located within the coupling housing prior to insertion of the pipe ends to be joined. The pre-assembled coupling provides that the pipe ends upon insertion can be gripped and retained by the gasket prior to tightening of the single adjustable fastener. The pre-assembled coupling can enable for expansion of the gasket upon pipe insertion and can utilize a single adjustable fastener to form a fluid tight seal between the gasket and the inserted pipe ends.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

While the present disclosure has been disclosed with reference to certain embodiments, numerous modifications, alterations, and changes to the described embodiments are possible without departing from the sphere and scope of the present disclosure, as defined in the appended claims. Accordingly, it is intended that the present disclosure not be limited to the described embodiments, but that it has the full scope defined by the language of the following claims, and equivalents thereof.

What is claimed is:

1. A pipe coupling, comprising:
a gasket comprising an annular base disposed about a gasket axis, a central flange extending from the annular base toward the gasket axis, a first side flange spaced from the central flange and extending from the annular base toward the gasket axis, and a second side flange spaced from the central flange opposite the first side flange; and
a housing surrounding the gasket, the housing having three segments sequentially coupled with each other, the three segments including a bridge segment, a first clamp segment, and second clamp segment,
the bridge segment having a first mount defining a first aperture and a second mount defining a second aperture;
the first clamp segment having a first hook disposed in the first aperture and a first tab defining a first fastener aperture;
the second clamp segment having a second hook disposed in the second aperture and a second tab defining a second fastener aperture; and
a fastener disposed through the first fastener aperture and the second fastener aperture, the fastener comprises a nut and a bolt, the fastener having a length at which the first clamp segment grips the gasket proximate the first hook and first tab, and the second clamp segment grips the gasket proximate the second hook and second tab.

2. The pipe coupling of claim 1, comprising:
the first clamp segment is identical to the second clamp segment.

3. The pipe coupling of claim 1, comprising:
an interior surface of the bridge segment is symmetrical about a plane perpendicular to the gasket axis.

4. The pipe coupling of claim 1, comprising:
the bridge segment have an arc length of about 90 degrees, and the first clamp segment and the second clamp segment each have an arc length of about 135 degrees.

5. The pipe coupling of claim 1, comprising:
the first side flange and the second side flange each comprise a buttress extending from the respective first side flange and second side flange.

6. The pipe coupling of claim 1, comprising:
the first hook and the second hook each comprise a base tapering to a catch.

7. The pipe coupling of claim 1, comprising:
the first hook is shaped to pivot against the first mount and the second hook is shaped to pivot against the second mount.

8. The pipe coupling of claim 1, comprising:
the first hook and the first mount form a first adjustable interlock, and the second hook and the second mount form a second adjustable interlock.

9. A pipe coupling, comprising:
a gasket comprising an annular base disposed about a gasket axis, a central flange extending from the annular base toward the gasket axis, a first side flange spaced from the central flange and extending from the annular base toward the gasket axis, and a second side flange spaced from the central flange opposite the first side flange; and a housing surrounding the gasket, the housing having three segments sequentially coupled with each other, the three segments including a bridge segment, a first clamp segment, and second clamp segment,
the bridge segment having a first mount defining a first aperture and a second mount defining a second aperture, the first mount and the second mount each comprise a pair of guides;
the first clamp segment having a first hook disposed in the first aperture and a first tab defining a first fastener aperture;
the second clamp segment having a second hook disposed in the second aperture and a second tab defining a second fastener aperture; and
a fastener disposed through the first fastener aperture and the second fastener aperture, the fastener having a length at which the first clamp segment grips the gasket proximate the first hook and first tab, and the second clamp segment grips the gasket proximate the second hook and second tab.

10. A pipe coupling system, comprising:
a gasket disposed about a gasket axis;
a pair of pipe ends; and
a housing sized to surround the gasket and to receive the pair of pipe ends, the housing having three segments sequentially coupled with each other, the three segments including a bridge segment, a first clamp segment, and second clamp segment,
the bridge segment having a first mount defining a first aperture and a second mount defining a second aperture;
the first clamp segment having a first hook disposed in the first aperture and a first tab defining a first fastener aperture;
the second clamp segment having a second hook disposed in the second aperture and a second tab defining a second fastener aperture, the bridge segment has an arc length of about 90 degrees, and the first clamp segment and the second clamp segment each have an arc length of about 135 degrees; and
a fastener disposed through the first fastener aperture and the second fastener aperture, the fastener defining a length at which the first clamp segment grips the gasket proximate the first hook and first tab, and the second clamp segment grips the gasket proximate the second hook and second tab.

11. The pipe coupling system of claim 10, comprising:
the length is a first length, the fastener defining a second length at which the housing is outward and spaced from the pair of pipe ends.

12. The pipe coupling system of claim 10, comprising:
an interior surface of the bridge segment is symmetrical about a plane perpendicular to the gasket axis.

13. The pipe coupling system of claim 10, comprising:
the fastener comprises a nut and a bolt.

14. The pipe coupling system of claim 10, comprising:
the first side flange and the second side flange each comprise a buttress extending from the respective first side flange and second side flange.

15. The pipe coupling system of claim 10, comprising:
the first mount and the second mount each comprise a pair of guides.

16. The pipe coupling system of claim 10, comprising:
the first hook and the second hook each comprise a base tapering to a catch.

17. The pipe coupling system of claim 10, comprising:
the first hook is shaped to pivot against the first mount and the second hook is shaped to pivot against the second mount.

18. The pipe coupling system of claim 10, comprising:
the first hook and the first mount form a first adjustable interlock, and the second hook and the second mount form a second adjustable interlock.

* * * * *